United States Patent Office 3,734,917
Patented May 22, 1973

3,734,917
DIPYRIDINIUM DICHROMATE PROCESS OF MANUFACTURE

John R. Corrigan and William M. Coates, Evansville, Ind., assignors to Mead Johnson & Company, Evansville, Ind.
No Drawing. Original application July 2, 1969, Ser. No. 838,705, now Patent No. 3,641,058, dated Feb. 8, 1972. Divided and this application July 29, 1971, Ser. No. 167,515
Int. Cl. C07d 31/24
U.S. Cl. 260—270                    16 Claims

ABSTRACT OF THE DISCLOSURE

An improved process for preparation of dipyridinium dichromate oxidizing reagent is provided.

CROSS-REFERENCE TO RELATED APPLICATION

This application is a division of my co-pending application Ser. No. 838,705 filed July 2, 1969, now U.S. Pat. No. 3,641,058, patented Feb. 8, 1972.

BACKGROUND OF THE INVENTION

The preparation of aldehydes and ketones by the oxidation of primary and secondary alcohols is a transformation of great importance in the field of organic chemistry and particularly in the synthesis of steroids and other relatively complicated organic compounds useful in the field of medicinal chemistry such as antibiotics and alkaloids. One method disclosed in the prior art involves the use of a chromium trioxidepyridine complex [G. I. Poos et al., J. Am. Chem. Soc., 75, 422 (1953), and L. H. Sarett, U.S. Pat. No. 3,164,611, Jan. 5, 1965] as an oxidant. Wide acceptance of the chromic anhydride-pyridine method resulted from its ubiquitous applicability, the high yields obtainable under relatively mild reaction conditions, its selectivity, and the fact that it is operable under basic conditions which was a unique advantage at the time of the development since methods available prior thereto required an acidic reaction medium. In multifunctional molecules of the type to which the process was especially suited functional groups were frequently presented which were subject to destruction by acid.

One of the disadvantages of the chromium trioxide-pyridine method is the extreme flammability hazard inherent in preparing the reagent. The literature is replace with reports and warnings of the fire hazard involved in preparing the chromium trioxide-pyridine reagent which requires the mixing of chromic anhydride with anhydrous pyridine. Although this hazard appears to be manageable on a laboratory scale and has not prohibited the wide application of the former method in research, it obviously poses difficulties for commercial scale organic synthesis.

OBJECT AND SUMMARY OF THE INVENTION

One object of the present invention is to provide an improved process for the oxidation of primary and secondary alcohols to their respective aldehydes and ketones which has the wide applicability and ease of operation of the pyridine-chromium trioxide method but which avoids the use of that hazardous reagent. In accordance with this objective an oxidation process which employs dipyridinium dichromate as the oxidizing reagent is provided in the present invention. A further object of this invention is to provide an improved process for the preparation of dipyridinium dichromate which employs readily available starting materials and is safe and convenient to operate.

Dipyridinium dichromate is the acid addition salt of pyridine and dichromic acid and has been previously reported in the literature by J. C. Collins et al., Tetrahedron Letters No. 30, p. 3364 (1968) who obtained it by hydration of the chromium trioxide-pyridine complex. However that method is not of preparative value with respect to the present invention since it makes use of the chromium trioxide-pyridine complex which it is desired to avoid for reasons previously indicated.

In accordance with one object of this invention, the oxidation process is carried out by intimately mixing dipyridinium dichromate and the alcohol to be oxidized in an inert liquid reaction medium. The dipyridinium dichromate oxidant may either be prepared in situ in the reaction medium or it may be prepared and isolated in advance and used when desired. In either case the dipyridinium dichromate oxidant is obtained by an improved process which comprises treating a dichromate salt with a strong acid in the presence of pyridine or alternatively by reaction of a strong acid salt of pyridine with the dichromate salt.

The dipyridinium dichromate oxidizing method of the present invention has the same wide applicability, efficiency and selectivity in oxidizing primary and secondary alcohols in polyfunctional molecules with preservation of acid sensitives groups thereof as the chromium trioxide-pyridine method. However, as will be readily apparent from the detailed description hereinafter provided, the dipyridinium dichromate oxidation method represents a distinct and substantial improvement over the old chromium trioxide-pyridine process. For example, in our method the dipyridinium dichromate oxidizing reagent can be easily prepared and employed in oxidizing carbinols on a laboratory- or on a large-scale without the flammability hazard inherent in the old chromium trioxide-pyridine method. Dipyridinium dichromate is storage stable for prolonged periods in contrast to the chromium trioxide-pyridine complex which is obtained from the more costly chromium trioxide and is ordinarily prepared just prior to use.

The safety, stability, ease of preparation, economic advantage, and wide applicability of the dipyridinium dichromate oxidizing reagent provides the basis of the improved processes embodied in this invention for the oxidation of primary and secondary alcohols and the preparation of dipyridinium dichromate.

DETAILED DISCLOSURE

The oxidation process embodied in this invention comprises intimately contacting dipyridinium dichromate hereafter also referred to as the oxidant with a primary or secondary alcohol.

The oxidation process is carried out in a liquid medium, which is inert under the reaction conditions, such as pyridine, acetone, and methylene dichloride preferably at room temperature although temperatures of $-10°$ C. to $80°$ C. may be employed.

The oxidation process of the present invention does not require anhydrous conditions for satisfactory results. Generally, however, it has been found that the rate of oxidation under anhydrous conditions is more rapid. This is illustrated in the following experiment wherein cinnamyl alcohol was oxidized to cinnamaldehyde using pyridine as the reaction medium. In carrying out the oxidation process by forming the dipyridinium dichromate oxidant in situ from sodium dichromate and aqueous hydrochloric acid, a 66 hr. reaction period provided the aldehyde in 80% yield whereas when the oxidant was prepared from sodium dichromate and anhydrous hydrogen chloride and the oxidation process then carried out a comparable yield of the aldehyde was obtained in only 18 hr. In both instances the reactions were conveniently carried out at room temperature.

In addition to carrying out the dipyridinium dichromate oxidation process in pyridine solution other unreactive reaction media such as methylene chloride and acetone can be used. Cinnamyl alcohol is oxidized to cinnamaldehyde in 18 hrs. or less, for example, in methylene chloride or acetone solvent in yields ranging from 69 to 74%. The relative short reaction period of 20 min. provides cinnamaldehyde in a 70% yield when methylene chloride is employed as the medium.

The improved process provided by the present invention for the preparation of dipyridinium dichromate oxidizing reagent is by metathesis between a pyridinium salt such as pyridine hydrochloride, hydrobromide, sulfate, phosphate, nitrate, para-toluene sulfonate, lauryl sulfate, etc. and an alkali metal or ammonium dichromate.

Stoichiometric quantities of a pyridinium salt and a dichromate salt are employed in the preparation of dipyridinium dichromate. By this is meant a molecular ratio of reactants which provides two molecular proportions of pyridinium ion per dichromate ion. For example, at least two molecular proportions of pyridine hydrochloride relative to one molecular proportion of an alkali metal or ammonium dichromate salt is required. Suitable reaction media for carrying out the preparation of dipyridinium dichromate are water, pyridine, methylene dichloride, carbon tetrachloride, acetone, methyl ethyl ketone, ethyl acetate, dibutyl ether, quinoline, etc.

When it is desired to isolate the dipyridinium dichromate oxidizing reagent after its preparation we prefer to employ pyridine as the solvent. However, other liquid media in which preferably one or both of the reactants are soluble may be employed. Classes of solvents and diluents which are useful in this connection are the lower alkyl ketones, lower alkyl ethers, lower alkyl esters, and polyhalogenated lower alkanes having up to four carbon atoms and from two to four halogen atoms.

A particularly useful method for the preparation of the dipyridinium dichromate oxidizing reagent is in situ formation by reaction of one molar proportion of an alkali metal or ammonium dichromate with two chemical equivalents of a strong acid and at least two molecular proportions of pyridine. By a strong acid it is meant an acid having a dissociation constant greater than dichromic acid. Suitable acids for use in this conversion include the so-called mineral acids, hydrochloric, hydrobromic, sulfuric, phosphoric and nitric and the strong organic acids such as the alkyl and aryl sulfonic and the alkyl sulfuric acids. The in situ preparation of dipyridinium dichromate oxidizing reagent is preferably carried out in pyridine. The oxidant can also be satisfactorily prepared by combining chemical equivalents of pyridine, a strong acid, and a dichromate salt or a pyridine salt such as pyridine hydrochloride and a dichromate salt in a liquid medium such as methylene chloride, acetone, chloroform, etc.

In some instances, the in situ method for the preparation of the dipyridinium dichromate oxidizing reagent is preferred for use in the oxidation process embodied in the present invention. In other cases, it is advantageous to prepare the oxidant in large quantities and use portions thereof as desired.

Dipyridinium dichromate prepared according to procedures disclosed in the present invention has a melting point of 145–148° C. and NMR values (broad) at 7.6, 8.1, and 8.6 delta with respect to tetramethylsilane absorption which are characteristic of pyridinium salts. It corresponds in composition to $C_{10}H_{12}Cr_2N_2O_7$ as determined by elemental microanalysis. It is not hygroscopic and may be stored for long periods of time before being employed in the oxidation process of this invention. No particular hazard is present during its preparation or storage making special safety precautions unnecessary. It is suitable for use in large scale oxidations of alcohols since spontaneous combustion does not take place when it is prepared.

The following examples, which are not intended to be limiting, illustrate the process for oxidizing primary and secondary alcohols with dipyridinium dichromate and the process for preparation of the dipyridinium dichromate oxidizing reagent embodied in the present invention.

DESCRIPTION OF THE PREFERRED EMBODIMENTS

Procedure 1.—Dipyridinium dichromate

A solution of sodium dichromate dihydrate (44.1 g., 0.148 mole) in 22 ml. of hot water is added with stirring to pyridine hydrochloride (34.0 g., 0.295 mole) in 22 ml. of hot water. The resulting solution is cooled to room temperature and the supernatent liquid decanted from deposited sodium chloride. The decanted liquid cooled overnight at 0° C. provides a crystalline precipitate which is collected and air-dried at room temperature to constant weight; yield 31.0 g. (56%), M.P. 145–8° C.

*Analysis.*—Calcd. for $C_{10}H_{12}Cr_2N_2O_7$ (percent): C, 31.92; H, 3.22; N, 7.45; Cr, 27.65. Found (percent): C, 31.30; H, 3.08; N, 7.16; Cr, 28.23. Infrared absorption maxima 540, 610, 685, 775, 890, 955, 1060, 1170, 1200, 1258, 1350, 1395, 1488, 1440, 1619, 1638, 2970, 3090, 3180, 3250, 3478 cm.$^{-1}$ (0.5% concentration in KBr).

Procedure 2.—Oxidation by dipyridinium dichromate in pyridine

A solution of the alcohol (0.05 mole) in 25 ml. of pyridine is added to a stirred suspension of dipyridinium dichromate (29.2 g., 0.0775 mole) in 50 ml. of pyridine at 20–25° C. After stirring 18 hr. at room temperature the black reaction mixture is poured into 700 ml. of water and the mixture then filtered to remove insolubles. The filtrate is extracted three times with 250 ml. portions of ether and the combined ethereal extracts washed successively with 100 ml. portions of 10% sulfuric acid, 10% potassium carbonate and then with water until the water wash is neutral (pH 7). The ether is removed by distillation and the carbonyl product characterized by preparation of the semicarbazone derivative Representative alcohols, carbonyl products derived therefrom and yields are as follows:

| Alcohol | Carbonyl product | Yield (percent) [a] | M.P., °C.[a] |
|---|---|---|---|
| Cyclohexyl | Cyclohexanone | 45.1 | 167–170 |
| Cinnamyl | Cinnamaldehyde | 80–90 | 216–218 |
| Benzyl | Benzaldehyde | 62 | 221–223 |

[a] Isolated semicarbazone.

Procedure 3.—Oxidation by dipyridinium dichromate in methylene chloride or acetone A solution of cinnamyl alcohol (6.7 g., 0.05 mole) in 50 ml. of methylene chloride is added to a suspension of dipyridinium dichromate (29.2 g., 0.0775 mole) in 200 ml. of methylene chloride at 20–25° C. After stirring 18 hr. at room temperature, the mixture is filtered and the filter-cake washed with 50 ml. of methylene chloride. The combined filtrate and wash is concentrated by evaporation on a steam bath and the cinnamaldehyde isolated and characterized as the semicarbazone; yield 7.8 g. (82.5%), M.P. 214–217° C.

Repeating the above procedure employing acetone as the medium in place of methylene chloride provides a yield of 6.5 g. (68.7%), M.P. 215–217° C., of the cinnamaldehyde semicarbazone.

The oxidation procedure repeated in methylene chloride wtih a 20 min. reaction time provides a 70% yield of the semicarbazone, M.P. 215–217° C.

Procedure 4.—Oxidation by dipyridinium dichromate prepared in situ from sodium dichromate in pyridine Dipyridinium dichromate is prepared in situ by the addition of sodium dichromate dihydrate (23.2 g., 0.0775 mole) to a pyridine solution of pyridine hydrochloride.

The pyridine hydrochloride solution is comprised of 65 ml. of pyridine to which 13.5 ml. (0.165 mole) of concentrated hydrochloric acid or alternately to which 6.0 g. (0.165 mole) of anhydrous hydrogen chloride gas is added.

The dipyridinium dichromate-pyridine reaction mixture is stirred for 1 hr. at room temperature, the alcohol (0.05 mole) in 25 ml. of pyridine is added at 20–25° C. and the reaction mixture stirred 18 hr. The product is isolated and characterized according to Procedure 2. Representative alcohols, carbonyl products and yields are:

| Alcohol | Carbonyl product | Yield (percent) | M.P., °C. |
|---|---|---|---|
| Cinnamyl | Cinnamaldehyde | a b 69 | a 216–218 |
| Do | do | a c 83 | a 216–218 |
| Piperonyl | Piperonal | a 90 | a 227–230 |
| Steroid triol d | Steroid-3-one | e 64–67 | e 238–242 | a Isolated as semicarbazone.
b Dipyridinium dichromate formed using concentrated hydrochloric acid.
c Dipyridinium dichromate formed using anhydrous hydrogen chloride.
d 6β-methyl-17α-propynylandrostan-3β,5α,17β-triol.
e Isolated as 6β-methyl-17α-propynylandrostan-5α,17β-diol-3-one.

Procedure 5.—Oxidation by dipyridinium dichromate prepared in situ from sodium dichromate in methylene chloride or acetone Pyridine (6.25 g.; 0.079 mole), concentrated hydrochloric acid (6.7 ml.; 0.079 mole) and sodium dichromate dihydrate (11.7 g.; 0.0395 mole) are stirred for 1 hr. in methylene chloride (100 ml.). Cinnamyl alcohol (3.35 g.; 0.025 mole) is added at 10–15° C. and the reaction mixture stirred for 3 hrs. After filtering to remove insoluble solids the filtrate is concentrated by distillation and the residue triturated with ether (100 ml.). The ether is removed via distillation and the product isolated as cinnamaldehyde semicarbazone; yield, 3.5 g. (74.0%); M.P. 212–214° C.

Repeating the above procedure employing acetone as the reaction medium provides an identical yield (74%), M.P. 212–214° C. of cinnamaldehyde semicarbazone.

The above procedure repeated in acetone medium with pyridine hydrochloride (5.76 g., 0.05 mole), sodium dichromate .2H$_2$O (7.5 g.; 0.025 mole) and cinnamyl alcohol (3.35 g.; 0.025 mole) provides after 18 hr. period 4–5 g. (94%) of cinnamaldehyde semicarbazone, M.P. 210–212° C.

Procedure 6.—Oxidation by dipyridinium dichromate prepared in situ from ammonium dichromate in pyridine Dipyridinium dichromate is prepared in situ as follows: Ammonium dichromate (19.6 g., 0.0775 mole) is added to the pyridine (65 ml.) solution containing pyridine hydrochloride (18.0 g., 0.155 mole). After stirring the oxidant mixture for 1 hr. at room temperature, the cinnamyl alcohol (6.7 g., 0.05 mole) is added at 20–25° C. The reaction mixture is stirred 18 hr. at room temperature and the product isolated and characterized according to Procedure 2; yield 7.0 g. (74%) of cinnamaldehyde semicarbazone, M.P. 212–215° C.

Procedure 7.—Oxidation with a 1:3.3 molar ratio of dipyridinium dichromate to alcohol substrate Dipyridinium dichromate is prepared in situ by addition of sodium dichromate dihydrate (5.0 g., 0.0167 mole) to pyridine (75 ml.) which contains 3.85 g. (0.033 mole) of pyridine hydrochloride. After stirring this mixture for 1 hr. at room temperature, piperonyl alcohol (7.6 g., 0.05 mole) is added at 20–25° C. and the mixture then stirred for 18 hr. The carbonyl product, 3,4-(methylenedioxy)benzaldehyde, is isolated and characterized according to Procedure 2 as the semicarbazone, yield 4.5 g. (43.3%), M.P. 225–229°.

What is claimed is:

1. The process for preparing dipyridinium dichromate which comprises reacting pyridine with an alkali metal dichromate or ammonium dichromate in a 2:1 molar ratio of said pyridine to said dichromate in the presence of a sufficient amount of an acid having a dissociation constant greater than dichromic acid to neutralize said pyridine in a reaction inert liquid medium.

2. The process for preparing dipyridinium dichromate which comprises reacting a pyridinium salt of pyridine and an acid having a dissociation constant greater than dichromic acid with an alkali metal dichromate or ammonium dichromate in an 2:1 molar ratio of pyridinium ion to said dichromate in a reaction inert medium.

3. The process of claim 1 wherein said acid is selected from the group consisting of hydrochloric, hydrobromic, sulfuric, phosphoric, nitric, alkyl sulfonic, aryl sulfonic and alkyl sulfuric.

4. The process of claim 1 wherein said reaction inert liquid medium is selected from the group consisting of water, pyridine, methylene dichloride, carbon tetrachloride, acetone, methylethylketone, ethyl acetate, dibutyl ether and quinoline.

5. The process of claim 1 which comprises reacting pyridine with sodium dichromate in the presence of hydrochloric acid in pyridine.

6. The process of claim 1 which comprises reacting pyridine with sodium dichromate in the presence of hydrochlroic acid in water.

7. The process of claim 2 wherein said acid is selected from the group consisting of hydrochloric, hydrobromic, sulfuric, phosphoric, nitric, alkyl sulfonic, aryl sulfonic and alkyl sulfuric.

8. The process of claim 2 wherein said liquid reaction inert medium is selected from the group consisting of methylene dichloride, acetone, chloroform, pyridine and water.

9. The process of claim 2 wherein said pyridinium salt is pyridine hydrochloride and said alkali metal dichromate is sodium dichromate.

10. The process of claim 9 wherein pyridine hydrochloride and sodium dichromate are reacted in water.

11. The process of claim 9 wherein pyridine hydrochloride and sodium dichromate are reacted in pyridine.

12. The process of claim 2 wherein said pyridinium salt is pyridine hydrochloride and said dichromate is ammonium dichromate.

13. The process of claim 12 wherein pyridine hydrochloride and ammonium dichromate are reacted in pyridine.

14. The process of claim 12 wherein pyridine hydrochloride and ammonium dichromate are reacted in water.

15. The process for preparing dipyridinium dichromate which comprises reacting pyridine with an alkali metal dichromate or ammonium dichromate in a reaction inert liquid medium in a 2:1 molar ratio of said pyridine to said dichromate in the presence of a sufficient amount of an acid having an acid strength sufficient to neutralize said pyridine and form a soluble pyridinium salt.

16. The process for preparing dipyridinium dichromate which comprises reacting a soluble pyridinium salt with an alkali metal dichromate or ammonium dichromate in a 2:1 molar ratio of pyridinium ion to said dichromate in a reaction inert liquid medium.

References Cited

UNITED STATES PATENTS

| 1,746,783 | 2/1930 | Zazier | 260—270 |
| 2,415,147 | 2/1947 | Ogilvie | 260—295.5 |
| 2,995,555 | 8/1961 | Lauver | 260—270 |
| 3,154,549 | 10/1969 | Beck | 260—687 |
| 3,429,875 | 2/1969 | De Winter | 260—239.55 |

DONALD G. DAUS, Primary Examiner